June 24, 1941.
E. ENDRES
2,247,191
CUT FLOWER HOLDER
Filed Dec. 18, 1939
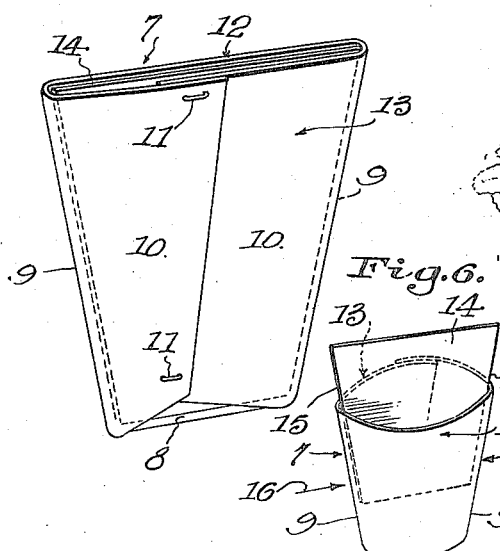
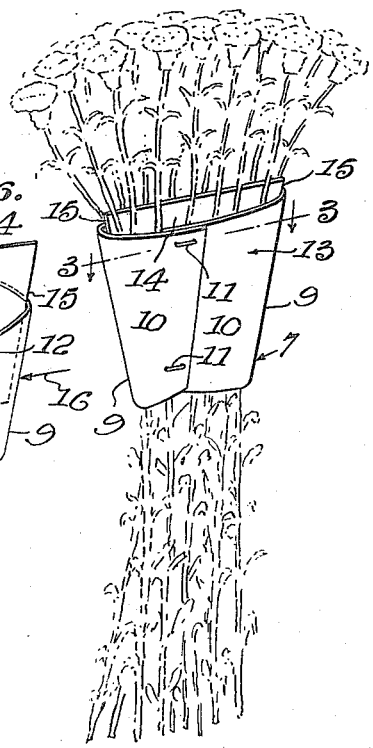
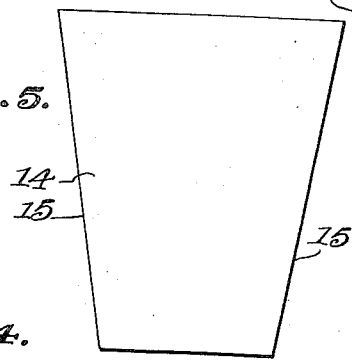
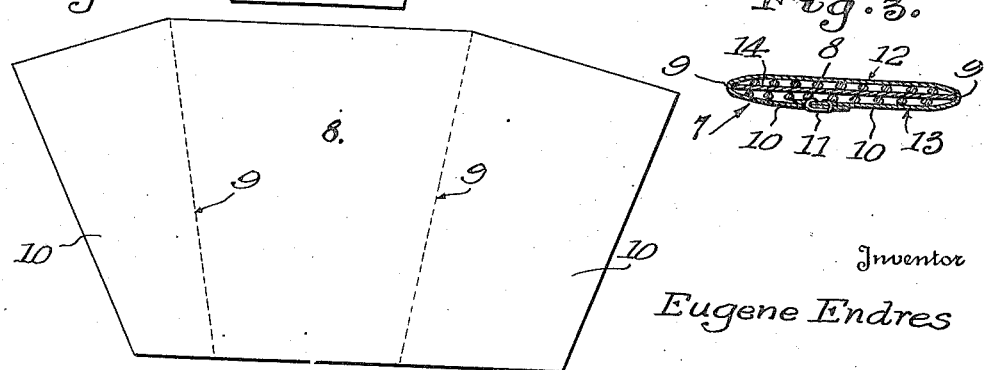
Inventor
Eugene Endres Patented June 24, 1941

2,247,191

UNITED STATES PATENT OFFICE 2,247,191

CUT FLOWER HOLDER

Eugene Endres, New Philadelphia, Ohio

Application December 18, 1939, Serial No. 309,870

3 Claims. (Cl. 229—87)

The invention aims to provide a new and improved holder of cardboard or the like for use principally by florists to hold cut flowers or plants in orderly fashion for local delivery or shipment.

With the foregoing in view, the invention resides in the novel subject matter hereinafter described and claimed, description being accomplished by reference to the accompanying drawing.

Figure 1 is a perspective view of the holder complete.

Figure 2 is a perspective view showing a plurality of cut flowers held by the holder.

Figure 3 is a horizontal section on line 3—3 of Fig. 2.

Figure 4 is a plan view of the blank of cardboard or the like from which the flattened sleeve of the holder is formed.

Figure 5 is a plan view of the divider of cardboard or the like for reception in the sleeve.

Figure 6 is a perspective view illustrating the manner in which edgewise pressure on the sleeve, with the divider partly withdrawn, will move the side walls of said sleeve away from said divider to facilitate insertion of the cut flowers.

In the drawing above briefly described, a preferred form of construction has been illustrated, and while this construction will be rather specifically explained, it is to be understood that variations may be made within the scope of the invention as claimed.

A flattened sleeve 7 is provided, preferably formed from a single sheet of cardboard or similar material 8 (Fig. 4) creased on converging lines 9 and having its end portions 10 overlapped and secured together, preferably by light wire staples 11. By forming the sleeve in this or an equivalent manner, it is given a flattened formation with its two side walls 12 and 13 connected along their converging edges by the creases 9.

A tapered divider 14, preferably formed from cardboard, is receivable between the side walls 12 and 13 with its converging edges 15 engageable with the creases 9. When this divider 14 is partially withdrawn from the sleeve 7 as seen in Fig. 6 and the creases 9 are pressed inwardly toward each other, as indicated by the arrows 16 in Fig. 6, the side walls 12 and 13 will be outwardly sprung away from said divider, thus facilitating insertion of the stems of cut flowers or the like between said side walls and said divider. After the stems have been inserted, forcing of the divider 14 as far as possible into the sleeve 7, will spread the creases 9, thereby drawing the side walls 12 and 13 inwardly, causing them to coact with the divider 14 in gripping the stems and holding them in orderly fan-like fashion.

If desired, the device may be sold completely assembled as shown in Fig. 1, a number of the devices being stacked and packaged in flat form. However, the device may also be marketed if desired, with the dividers 14 removed from the sleeves 7 to be inserted by the florist. Then too, the blanks shown in Fig. 4 and the dividers 14 may be marketed prior to forming the sleeves from the blanks, leaving completion of the article and assembly to the florist. When marketed in this form, the device may be used by placing one of the blanks 8 flat upon a table, laying about half of an order of cut flowers upon the central portion of the blank, then placing the divider 14 upon the stems of the flowers, laying the remainder of the order upon said divider, inwardly folding the ends 10 of the blank into overlapping relation with each other and securing said ends by stapling or tying.

It will be seen from the foregoing that a simple and inexpensive and very desirable article has been provided for holding cut flowers and the like in orderly fashion for local delivery or shipment. While preferred details have been disclosed, attention is again invited to the possibility of making variations within the scope of the invention as claimed.

I claim:

1. A cut flower holder comprising a flattened sleeve open at both ends and having two longitudinal creases positioned to provide it with two opposed side walls joined by said creases, and a flat divider between said side walls and having two of its edges engaged with said creases.

2. A cut flower holder comprising a flattened and tapered sleeve open at both ends and having two longitudinal creases positioned to provide it with two tapered side walls joined by said creases, and a flat tapered divider between said side walls and having its converging edges engaged with said creases.

3. A cut flower holder comprising a flattened and tapered sleeve open at both ends and having two longitudinal creases positioned to provide it with two tapered side walls joined by said creases, and a flat tapered divider between said side walls and having its converging edges engaged with said creases, said divider being free from connection with said sleeve, whereby said divider may be partially withdrawn to permit edgewise manual contraction of said sleeve for the purpose of springing said side walls away from the divider to facilitate flower stem insertion, and said divider may then be forced back into the sleeve to spread the latter edgewise and thus move said walls toward the divider to grip the flower stems.

EUGENE ENDRES.